United States Patent
Brickell et al.

(10) Patent No.: US 6,678,676 B2
(45) Date of Patent: Jan. 13, 2004

(54) SUMMARY CREATION

(75) Inventors: Paul Philip Brickell, Bristol (GB); Stephen David Cave, Gloucester (GB); Robert Lloyd Lavender, Nr. Wedmore (GB); James Adam Steadman, Bradlow Ledbury (GB)

(73) Assignee: Oracle International Corporation, Redwood Shores, CA (US)

( * ) Notice: Subject to any disclaimer, the term of this patent is extended or adjusted under 35 U.S.C. 154(b) by 213 days.

(21) Appl. No.: 09/730,828

(22) Filed: Dec. 7, 2000

(65) Prior Publication Data

US 2002/0010706 A1 Jan. 24, 2002

(51) Int. Cl.$^7$ ............................................ G06F 17/30
(52) U.S. Cl. ...................................................... 707/3
(58) Field of Search ...................... 707/3, 104.1, 102, 707/4, 1, 100

(56) References Cited

U.S. PATENT DOCUMENTS

| | | | | |
|---|---|---|---|---|
| 6,023,695 A | * | 2/2000 | Osborn et al. | 707/3 |
| 6,035,306 A | * | 3/2000 | Lowenthal et al. | 707/200 |
| 6,049,798 A | * | 4/2000 | Bishop et al. | 707/10 |

FOREIGN PATENT DOCUMENTS

EP      0706140 A1      10/1996

\* cited by examiner

*Primary Examiner*—Safet Metjahic
*Assistant Examiner*—Sana Al-Hashemi
(74) *Attorney, Agent, or Firm*—Swidler Berlin Shereff Friedman, LLP

(57) ABSTRACT

The present invention relates to apparatus for creating summaries of a database. The apparatus includes a processor which is adapted to monitor the usage of the database and, determine one or more summaries in accordance with the usage.

19 Claims, 3 Drawing Sheets

SUMMARY CREATION

SUMMARY CREATION

1. Field of the Invention

The present invention relates to apparatus for creating summaries of a database, and in particular to apparatus for creating summary tables used to increase the speed of access to information contained within a database.

2. Description of the Prior Art

The majority of databases currently available consist of a data store in which the data is divided up into a number of tables. Joins are created between the tables to allow data stored in different tables to be linked.

Database are usually provided in a normalized form so that there is no redundancy in the data, thereby ensuring that the database uses the minimum amount of storage space necessary. This is achieved by arranging the tables such that data is not repeated in multiple tables.

However, this form of storage has implications regarding searching for data in the database. Generally, searching is achieved by submitting a query in a structured query language such as SQL. The database receives the SQL query and determines from the query what information is required. This information is searched for within the tables and output as a response. The time taken from receiving the query to outputting a result as known as the query execution time.

As will be appreciated by a person skilled in the art, the size of the tables vastly effects how long the searches take. Accordingly, if a large amount of data is present in the table, it may take a significant amount of time to locate the data in the table and generate an output.

In order to reduce the query execution time for regularly run queries, it is known to provide a series of summary tables. These summary tables effectively summarize data already contained within the tables by maintaining a separate copy of the data in a summary table. The summary tables, which are generally smaller than the tables of the database itself are designed such that the data required to answer regularly run queries is more readily available. Thus for example, if one particular query is run daily it is possible to create a summary table including only the data required to answer that query and no other data. When this query is next received, the query is rewritten so that the data is obtained directly from the summary table instead of the usual detail tables. This ensures that the query is answered in as short a time as possible.

However, the summary tables can currently only be generated manually. Accordingly, this requires a system administrator to monitor usage of the database, for example by monitoring the queries submitted to the database and then determining which summary tables would provide the greatest improvement to the database operating efficiency. In particular, there will typically only be a limited amount of space in which summary tables can be provided and as these provide redundant data, it is preferable to only provide summary tables if these will result in a noticeable improvement in the query execution time.

However, it is extremely difficult for a system administrator to accurately judge which summary tables would provide the optimum increase in the query execution time for the entire database. Furthermore, the system administrators have to construct and maintain the tables themselves, which can require monitoring of the database usage on a daily basis. This is time consuming and an extremely difficult procedure.

SUMMARY OF THE INVENTION

In accordance with the present invention, we provide apparatus for creating summaries of a database, the database being responsive to a query to provide data, the apparatus comprising a processor coupled to a database, the processor being adapted to:

a. monitor the usage of the database; and, b. determine one or more summaries in accordance with the usage.

Accordingly, the present invention provides apparatus for automatically determining summaries that should be used by the database. The apparatus achieves this by monitoring the usage of the database and then using this information to determine one or more summaries which may be used. This allows summaries to be created without requiring a systems administrator having to make predictions about the usage of the database. As a result, any subsequent queries which require data which is contained in one of the summaries will have a query execution time which is far lower than when the summary is not present.

Typically the system monitors the usage of the database by monitoring the number of queries made and the length of time taken for the database to generate a response to each query. However, alternatively, the usage may be determined on an access cost basis with different forms of query having a different associated cost.

The one or more summaries are preferably determined by causing the processor to propose a number of summaries, determine the improvement achieved by using the proposed summaries and, select one or more of the summaries in accordance with the improvement achieved using the summary. Thus, this ensures that summaries which result in the most benefit are used.

The proposed summaries typically correspond to data provided by the database in response to a received query. Such summaries are perfect match summaries. However, alternatively imperfect match summaries may be used in certain circumstances. The use of imperfect match summaries allows responses to be generated solely from a summary table for non-identical queries. Such imperfect match summaries are typically created by combining or generalizing existing summaries.

The processor also usually proposes summaries in accordance with a number of defined proposal parameters, such as an indication of the nature of the queries submitted to the database. Thus, whether perfect or imperfect match summaries are used can depend on the nature os queries submitted to the database. Alternative factors, such as the amount of space available for summary storage may also be taken into account. This allows certain queries to be more influential in the generation of summary tables, so that, for example, it can be ensured that summaries are created for certain queries.

However, alternative methods may be used. Thus, for example, the system may not have any space limitations in which case, it will generally simply propose a summary and then implement it as the use of any summaries will result in an improvement in the overall query execution time of the database. Alternatively, the system administrator may desire to use certain summaries and these can therefore be designated as predetermined summaries which the apparatus is not able to alter.

The processor is typically adapted to determine the improvements achieved in accordance with the length of the time taken for the database to generate a response to each query with a summary present, the length of time taken for the database to generate a response to each query with no summary present and, the number of times the given query is submitted to the database in a given time period. This advantageously allows the apparatus to predict the total query execution time improvement that will be obtained for the database over a given time period, assuming that typical queries are submitted. Thus, for example, the apparatus can work out the total reduction in the query execution time that would be achieved for a given query for an entire day, given the number of times the query would typically be submitted in one day. This value can then be summed for a range of queries to determine an overall query execution time reduction. However, any suitable method of judging improvement, such as determining a reduction in the number of operations performed by the processor, or a reduction in the cost access requirements, may alternatively be used.

One possibility is for the length of time taken for the database to respond to a query with a summary present to be estimated in accordance with the size of the summary and a predetermined algorithm. This allows the processor to use the size of the proposed summary to estimate the query execution time for a query which only accesses the given summary. This allows the processor to determine the improvement in the query execution time that is obtained even if the summary is never produced. Of course, if the summary is already present and is currently in use, then the estimate is not required.

The processor is typically coupled to a store and may also be further adapted to generate selected one(s) of the one or more summaries, using data from the database, the summaries being stored in the store. In this case the system can be configured to automatically construct the summaries, without human intervention, allowing the system can therefore be left operating in the absence of a system administrator. Alternatively however the selection may be performed by a system administrator allowing specific summaries to be chosen and allowing the administrator to monitor the summaries used.

Typically the processor is adapted to select the summaries in accordance with a number of selection parameters, such as the size of the store. This allows the system administrator to specify the total size that the summaries should be limited to by limiting the size of the store. As will be appreciated by a person skilled in the art, the larger the number of summaries that are produced, the greater the improvement in the query execution time of the database. However, the more summaries are produced, the more redundancy there is in the database.

However alternative selection parameters may be used allowing a system administrator to specify summaries for creation and/or deletion and these can be set to ensure that they are not altered by the processor in accordance with the set selection parameters. Again, this allows certain queries to be more influential in the generation of summary tables, so that, for example, it can be ensured that summaries are created for certain queries. Additionally, some summary tables, once defined, may be fixed so that they are unalterable, whereas others may be alterable only after certain periods of time, or the like.

The processor is usually adapted to repeatedly modify the summaries in accordance with the usage at a predetermined time interval. This allows the system to ensure that the summaries are constantly updated so that redundant summaries are not maintained and to ensure the best query execution time is obtained even if the usage of the database has changed significantly over time. As this process is automatic and does not require any substantial input from a system user or system administrator the predetermined time interval may be as little as a few hours. Typically however the predetermined time interval will be either 24 hours or 1 week allowing the process to be carried out when the database is not heavily used.

It will be appreciated that as well as creating new summaries by repeating steps (a) and (b) to determine one or more view summaries and then generating selected ones of the one or more new summaries, it is also possible to delete summaries, or alternatively modify currently existing summaries to provide improved summaries.

BRIEF DESCRIPTION OF THE DRAWINGS

An example of the present invention will now be described with reference to the accompanying drawings, in which.

DETAILED DESCRIPTION OF THE DRAWINGS

Figure 1:
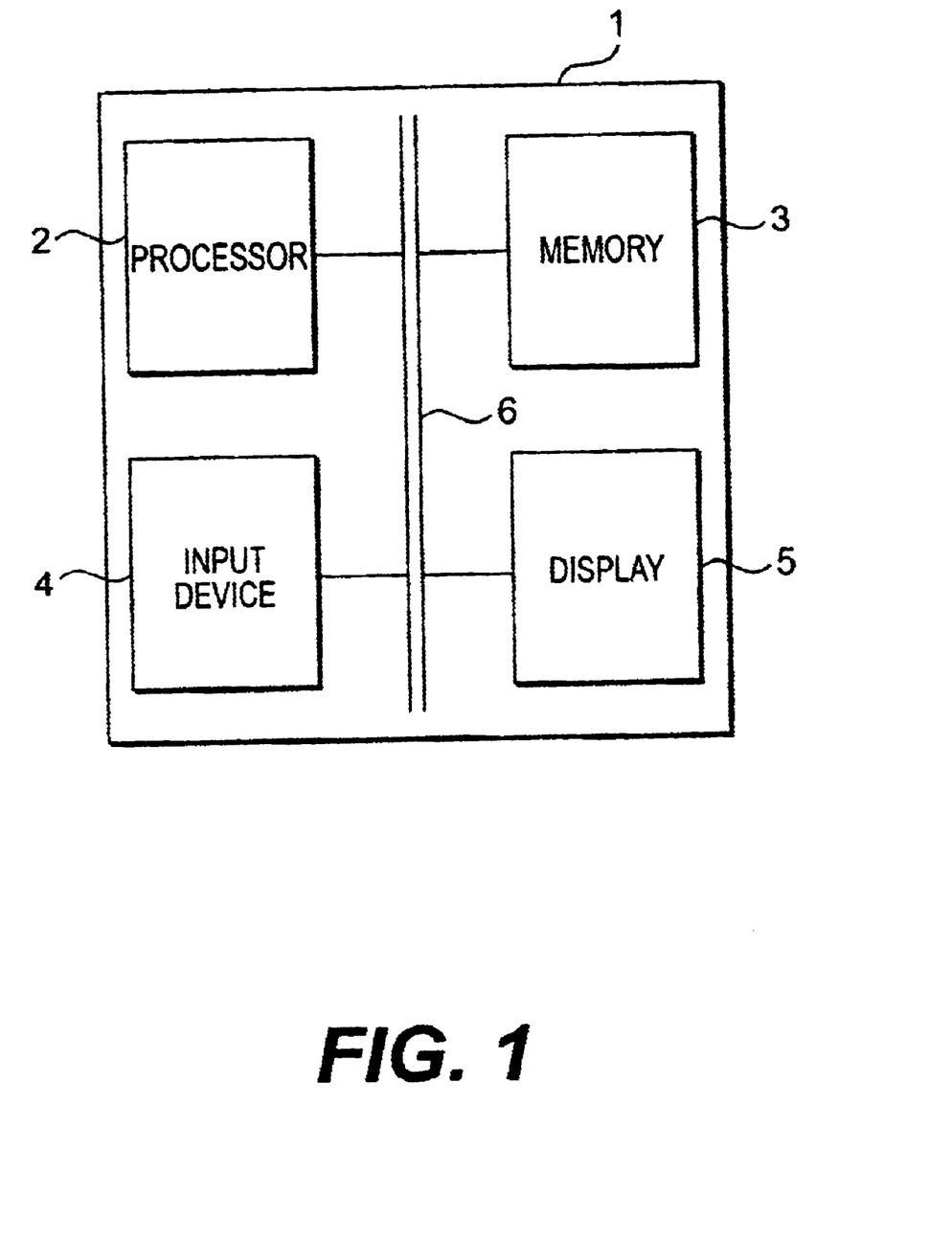
FIG. 1 is a schematic diagram of apparatus for operating in accordance with the present invention.

FIG. 1 shows apparatus suitable for implementing a database in accordance with the present invention. The apparatus consists of a computing device 1 including a processor 2, a memory 3, an input device 4 and a display 5, all of which are coupled together via a bus 6.

In use, the database is contained within the memory 3 and can be accessed by the user inputting database queries via the input device 4. Database queries input via the input device 4 are transferred via the bus 6 to the processor 2 which parses the query to determine the information which needs to be obtained from the database. The processor 2 then accesses the database and obtains the relevant data as required before this is transferred back to the output device 5 for presentation to the user.

In order to use the system, the system user may have to log onto the database by entering a User ID and a User password. In this case, the User ID and the User password are transferred from the input device 4 to the processor 2 where they are compared with User data stored in the memory 3. The processor 2 will compare the entered User ID and password with the User data stored in the memory to determine whether the User has access to the system. If so, the processor 2 will indicate this to the User via the display 5 allowing the user to access any of the data stored in the memory 3.

Once the system has been accessed, data can be obtained from the database by inputting a query using the input device 4. The query, which is usually input using the SQL query language, is transferred to the processor 2 where it is parsed to determine what information is to be obtained from the database. The processor 2 then accesses the database in the memory 3 and obtains the data as required, before transferring the data to the output device 5 for presentation to the user.

Figure 2:
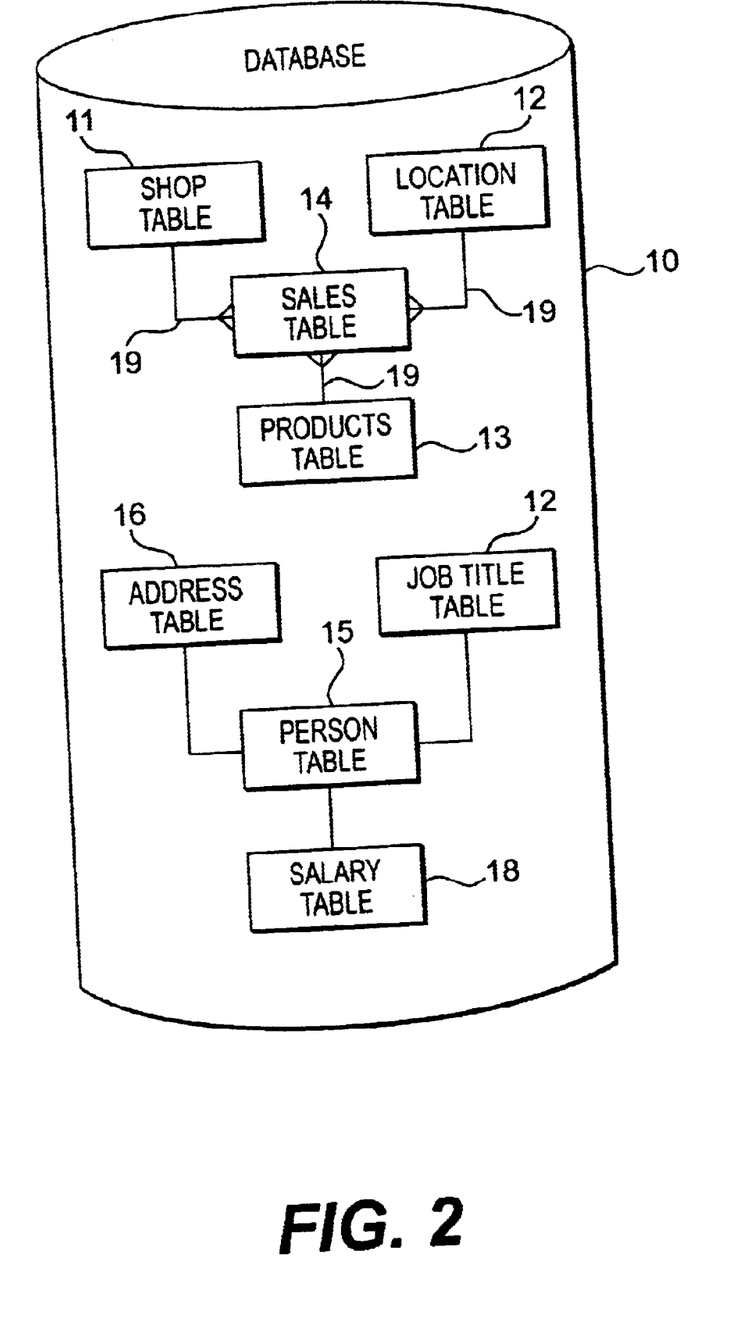
FIG. 2 is a schematic diagram representing the content of the database shown in FIG. 1; and, FIG. 3 is a graph showing the estimated benefit that can be obtained using the present invention.

A schema tical representation of the database is shown in FIG. 2. In this example, the database 10 is a database including details of the performance of a large chain of shops. In this example, the data is stored in a number of separate detail tables including a shop table 11 and location table 12, a products table 13 and a sales table 14. Further tables concerning company employees are also provided in the form of a person table 15, an address table 16, a job title table 17 and a salary table 18.

In this example, the first set of tables 11,12,13,14 form a related group of tables in that information contained in each of the tables is generally related to information contained in each of the other tables in the set. Similarly the tables 15,16,17,18 also form a related set. The first set of tables are connected by appropriate links 19 which are used by the processor 2 when searching for information contained within the tables.

As shown the links 19 between the sales tables 14 and the shop, location and products tables 11,12,13 include many to one links in that for several references of sales in the sales table 14 there will only be a single reference in the respective shop, location and products table 13. This indicates that the sales table 14 is subordinate to the shop, location and products tables 11,12,13. Furthermore, as there are no tables which are subordinate to the sales table the sales table is referred to as a fact table, as will be explained in more detail below.

Similarly, the second set of tables are also joined by appropriate links 20.

An example of the query process will now be described. Firstly, the user may enter a query requesting information concerning the sales of certain products from a given shop. Accordingly, the user generates a suitable query which is transferred to the processor 2. The processor 2 determines the information which is required and accesses the shop table 11, the products table 13 and the sales table 14 stored in the database 10 in the memory 3. The relevant information concerning the shop and desired products is then presented to the user on the output device 5.

As will be appreciated by a person skilled in the art this particular query requires that the shop table 11, the products table 13 and the sales table 14 are all accessed and this would therefore be time consuming. Furthermore, the query may typically require the aggregation of data contained within the tables. Thus for example the query may require that a total sales figure is returned indicating the financial total of all sales made. Again, this information must be calculated each time the summary is produced and again, this can cause further increases in the query execution time.

Accordingly, it is desirable for the present invention to utilize summary tables which would be stored as additional tables with the database 10. The summary tables can be designed to include only the data required to answer a specific query. This allows the data required to respond to the query to be accessed in a vastly reduced time. Furthermore, the summary tables can include calculated values, such as a summation of data, thereby obviating the need for calculations to be made on line.

Operation of the present invention to generate and maintain the summary tables will now be described. The general process of the present invention can be summarised as follows:

The processor 2 determines workload statistics by monitoring usage of the database 10.

For given policy settings the processor 2 determines which existing summaries should be deleted purely due to a lack of utilisation The processor uses a ranking algorithm to determine which queries are most in 'need' of performance tuning, and to rank queries by this measure using the workload statistics.

The processor may first eliminate queries which are run infrequently to save on processing costs.

For each query in the ranked list, the processor 2 determines exact match summary tables.

For each candidate summary table in the above list the processor 2 calculates the theoretical performance benefit.

The processor 2 then ranks the candidate summary tables by performance benefit.

The processor 2 reconsiders deleting existing summaries that have a lower theoretical performance benefit than the proposed candidate summaries.

The processor 2 can make proposals concerning the creation and deletion of summary tables.

The processor 2 can then either:
  implement changes which have been approved by a system administrator; or,
  automatically implement the summaries that will result in the most benefit based on the current settings.

Workload Statistics

In order to determine the workload statistics of the database 10, the processor 2 monitors the queries which are transferred to the database 10 and determines the query execution time required to generate an answer to the query. This information is then stored in a workload statistics table as shown for example in Table 1.

TABLE 1

| Query | Frequency | Average Query Execution Time(s) | Tables Accessed |
|---|---|---|---|
| Q1 | 2 | 10 | Sum1 |
| Q2 | 1 | 100 | T1, T2, T3 |
| Q3 | 5 | 50 | T1, Sum1 |
| Q4 | 10 | 50 | T3, T5 |
| Q5 | 3 | 20 | T2 |

As shown, for each of the queries Q1,Q2,Q3,Q4,Q5 the processor monitors how many times the query has been submitted and determines average query execution time which is stored as shown. The system also stores an indication of the Tables accessed by the query. This allows the processor 2 to determine if an improvement would be achieved using an alternative summary for example. This is completed for each of the queries submitted to the database 10 during any one time period, which would typically be one day, or one week or the like. This allows the system to determine for which queries summary tables should be produced, as will be explained below.

Policy Settings

It is possible to set a number of policy settings to control the creation of summary tables by the processor 2. The main policy setting is the allocation of space in the database 10 in which summary tables can be stored. As will be appreciated by a person skilled in the art, the larger the space allocated for the saving of summary tables, then the more summary tables will be created. This will increase the number of queries that are able to execute summary tables as opposed to the more detailed database tables and therefore will reduce the over all query execution time for the database. However, an increased number of summary tables also increases the redundancy of the data within the database and causes an increase in the processing costs of the database. Accordingly, it is necessary for the system administrator to determine how much memory space is to be allocated to the production of summary tables.

Secondly, the system administrator can designate certain summary tables for deletion or maintenance so that this cannot be overridden by the processor 2. Thus, the system administrator can indicate that summary tables used, for example by a certain person, may be maintained whatever the processor 2 calculates should be the preferred summary tables. Furthermore, the system administer can also designate some summary tables for deletion.

A further option is for the system administrator to indicate that summary tables should be maintained for only a predetermined length of time without use. Thus, if a summary table is not used for a week, then it may be that the queries which used to access that summary table would no longer be used and accordingly, the table can be deleted.

A further option which will be described with respect to the enhanced recommendation algorithm below is for the user to indicate the nature of the database usage. This is achieved by indicating whether the queries submitted to the table are predetermined, such that the queries follow a standard configuration, or ad-hoc queries, in which the structure of queries will typically vary from query to query. In this initial predetermined setting, which is the default setting used by the processor 2, it is assumed that queries will all follow a predetermined standard. Accordingly, it is typical that queries are produced which access the same summary tables repeatedly. Accordingly, with this setting the processor 2 operates to generate exact match summary tables only. These are summary tables which include data required to answer specific queries only and no further data. This is compared to inexact match summary tables in which larger summary tables are created which provide more data than is required to answer any one query but which are typically capable of answering a number of different queries. This will be explained in more detail below.

The Ranking Algorithm

For the list of queries for which workload statistics have been calculated, the following ranking algorithm is used by processor 2 to determine their relative need of performance tuning:

$$IR = \log(f) 2 \times \log(elt+1) \quad (1)$$

where:

IR=Item ranking log=log to the base 10 f=frequency (number of times the same query was requested)

elt=average elapsed time for these queries in seconds.

This formula has the following characteristics:

It places more importance on frequently run queries than on the execution time.

It 'flattens' at the bottom end, reducing the otherwise big differences caused by execution times that approach zero.

It scales over very large frequencies of queries, due to the logarithmic nature of the formula.

Once the IR has been calculated for each query, as set out above, the queries which access a given Fact table are then examined. For each fact table a Fact Percentage Ranking (FPR) using the following formula:

$$FPR = (\Sigma fIR / \Sigma IR) \times 100 \quad (2)$$

Where:

ΣfIR=sum of the IR for each query using that fact table

ΣIR=total IR for all queries

This allows all the fact tables to be ranked according to the FPR. Once this has been completed, the IR for each query calculated above is modified using the following formula, to derive a Query Percentage Ranking (QPR), as follows:

$$QPR = ((IR \times FPR)/((IR \times FPR)) \times 100 \quad (3)$$

The QPR of a query shows how much the performance improvement is needed on that query in relation to the other queries. Accordingly, by sorting the queries in accordance with the calculated QPR, this effectively ranks the queries in an order of importance for summary table production.

It will be appreciated from the above that this algorithm has an inherent bias towards creating summary tables for frequently used fact tables.

In addition to this built in bias, it is intended that user-defined weightings can also be applied to any or all tables/ folders, such that the above ranking will be affected in favour of higher weighted tables.

These weightings are included within the policy settings mentioned above.

Summary Table Determination

Once the processor 2 has determined a ranked query list, excluding any queries for which summary tables are not required, then the processor 2 determines exact match summary tables for each query in the list. The exact match summary tables are the summary tables that are required to provide all the data required to answer the query without providing any additional data within the summary table. These summary tables are determined by consideration of the query and the data provided in response to the query. The summary tables however are not produced but are merely determined to the extent that the data from the database is used to form the summary table if necessary.

The Benefit Measure

Figure 3:
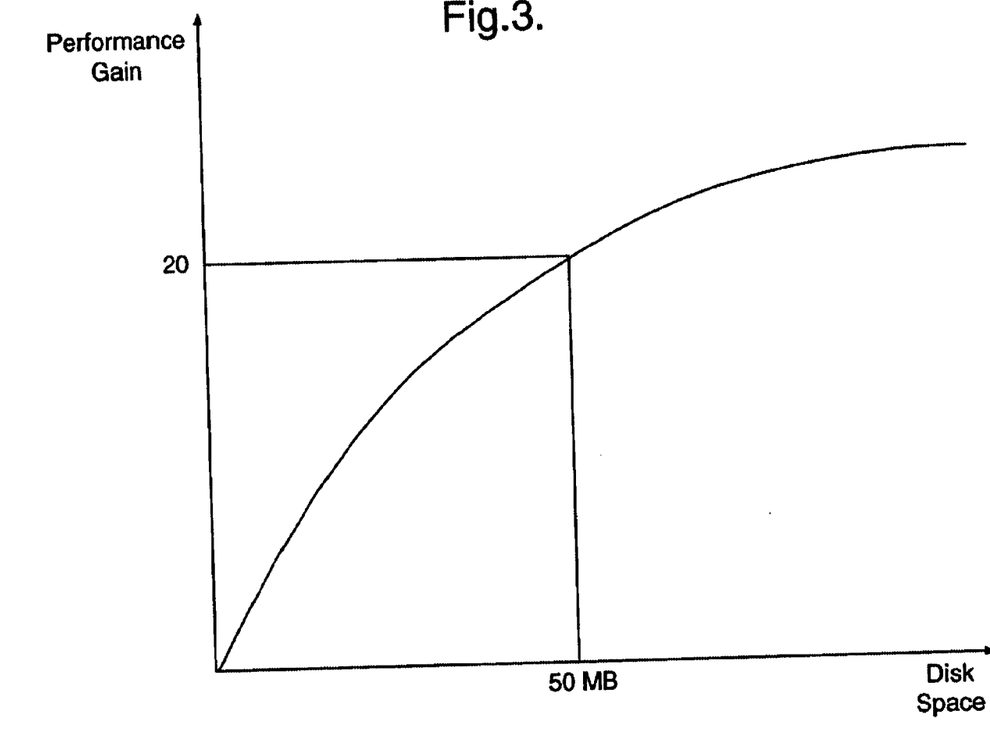

Once the summary tables are determined, the processor 3 calculates a benefit measure which is an indication of the reduction that will be obtained in the query execution time by having the summary present.

The benefit measure is calculated by the processor 2 as follows:

Calculate the SDR, (Summary to Detail Reduction factor).

[This factor shows by how much a summary reduces the detail tables. This value will be between 0 and 1, where 1 would indicate no reduction and 0 would indicate maximum reduction. For example, a summary table that contains 250 rows of data, which is used in place of using detail tables which have 1000 rows, the reduction factor would be 250/1000 or 0.25.]

For each query that would have used this summary, had it been in place previously, calculate the average number of executions per day.

Calculate the average execution time spent on those queries per day.

Now apply the SDR factor to this average execution time per day

From the previous two steps, an estimated 'time-saved' value can be associated with each candidate summary.

Calculate the 'speed increase' factor: total time (for all queries)/(total time−time saved)

In the case in which workload statistics are available for given queries, then these are used in the calculation of the summary to detail reduction factor. This can be achieved for example by comparing the query execution time obtained when the summary table is not present to the query execution time obtained when the summary table is present. In this case, the SDR therefore represents the factor by which the query execution time is reduced for a given query, by having the summary table present.

Where no workload statistics are available, a benefit measure must be estimated for a candidate summary.

In this case, the estimated benefit is based on the structure of the underlying data. In the absence of workload statistics it is only possible to determine by how much a candidate summary table will reduce the number of rows of data processed if a query used that summary table as opposed to the standard database detail tables.

This results in the determination of an SDR factor, which is used as the SDR factor discussed above. Thus the SDR factor is still a good indicator of by how much faster a query will execute with a summary, since it is the row reduction effect of summaries that yields the greatest gains.

Thus, a benefit figure of say 5 would indicate that if the same queries within the workload statistics were executed again they would complete 5 times as fast.

This measure will be calculated for all candidate summaries, and a graph produced to illustrate the estimated benefit that can be gained for a given amount of disc space, as shown for example in FIG. 3. In this case, the y-axis will show the performance gain (or benefit, as described above), and the x-axis will show disc space.

Where 50 MB of disc space is selected, for example, the graph may indicate that this will be enough space to create summaries that will yield a performance gain of 20. This means that if the same previously executed queries were executed again they would finish 20 times as fast.

Note: the basic information as to how many rows are in the detail tables and/or in any proposed summary tables is retrieved from a database dictionary, (i.e. structural statistics) which is stored in the memory 3. Alternatively, for efficiency, previously executed queries have 'number of rows' information stored against them in the workload statistics tables, such that proposed exact match summaries can use these figures instead.

Summary Proposal

Once the processor 2 has determined the "speed increase" factor for each summary table, the processor 2 lists the summary tables in speed increase factor order indicating which tables will improve the query execution time of the database the greatest. This list includes proposals to the acceptance and rejection of certain summaries in accordance with the desired policy settings.

Thus, for example, the processor considers the existing summaries currently in place and determines those that have a lower theoretical performance benefit than the proposed candidate summaries. The processor then indicates that these should preferably be deleted whilst making proposals concerning the creation of new summary tables in accordance with the list.

Accordingly, the processor 2 will list the summary tables which if produced would result in a decrease in the query execution time for the database as a whole. Similarly, the processor 2 will indicate summary tables which will also result in a minor increase or minor decrease in the query execution time.

This allows a system administrator to determine and control which summary tables should be created and deleted.

However, typically the system administrator will configure the system to automatically accept the proposed summaries. In this case, the system automatically implements the summary tables which result in the optimum operating efficiency of the database, based on the current settings, without requiring input from the system administrator. These proposals will therefore generally indicate the summary tables which should be produced in order to obtain the fastest query response time in accordance with the entered policy settings.

It will be appreciated from this therefore that the processor 2 must take into account the benefit obtained by the summary tables currently in place as well as the new summary tables proposed in the list.

Once the proposals have been finalized, the processor 2 will then determine which summary tables contained within the database 10 should be deleted and delete these accordingly. The processor 2 will then arrange for the desired new summary tables to be created. As described above, the summary tables are formed in the database 10 from the data contained in the detail tables. However, alternatively, if the system is configured appropriately, then the summary tables may alternatively be created in the memory 3, allowing the required information to be obtained without accessing the database.

Accordingly, the present invention will therefore operates to maintain summary tables so as to optimize the operation of the database.

Additional modifications which can be made to the present invention will now be described.

The Target Performance Recommendation Algorithm

Where administrators wish to use all available resources to reduce the execution times of queries deemed to be of most 'need' of performance tuning, they may choose to use this alternative algorithm. Rather than considering the relative merits of the proposed candidate summaries, this algorithm purely basis its recommendations on the measure of 'need' identified in the second step. Exact match summaries would be created in order of the 'need' ranking.

The Enhanced Recommendation Algorithm

The process described in detail above operates using exact match summaries. However, depending on the Administrators choice, a compromise between summary table coverage and system performance can be made which would potential change the shape of the recommended summaries.

This algorithm can be tuned to either reflect a situation where users run predetermined queries, or a situation where users run ad hoc queries. A selection is made along a sliding scale, somewhere between these two extremes, to reflect the balance of all users between these two settings.

The simple algorithm above fits the purely specialist case, i.e. where users tend to only run predetermined queries. Under these circumstances having exact match summaries for previously executed queries will work very well , since future queries are expected to be the same (or very similar).

At the other extreme, where previous queries are not such a good guide for future queries, the algorithm can be altered to sacrifice some performance gain, (which would be maximised where an exact match summary is found for a query), in order to increase the chance that a candidate summary would be used by a greater and more diverse set of queries (i.e. increase coverage), see performance gain algorithm below.

The Performance Gain Algorithm

In order to achieve the more diverse summaries, the processor 2 operates by enhancing simple candidate summaries proposed in the above algorithms, by combining and substituting existing summaries.

As described above, to set the degree to which this process will alter the simple list of candidate summaries, the Administrator will need to set a policy setting defining the nature of the usage of the database. Thus, this may be achieved, for example, by selecting a setting to indicate whether the queries are typically predetermined or ad-hoc.

If the Administrator believes that query usage is fairly static in nature then the maximum benefit will be achieved by setting the queries to the Predetermined (Max Performance) side of the scale. If the Administrator believes that query usage changes over time, choosing the Ad Hoc (Max Coverage) end of the scale will yield the maximum benefit, since the potential for a greater range of new queries to gain from the recommended summaries is higher.

It will be realized that by increasing the number of dimensions a summary table has, then the summary table becomes relevant to a greater number of queries. However, increasing the number of dimensions also increases the redundancy of the data in the database, as well as increasing the query execution time of queries accessing the summary tables.

To understand the implications of this, it is useful to consider the following examples set out in Table 2 below.

In this example the simple algorithm has suggested two candidate summaries, Sum1 and Sum2. Here we consider whether rolling these two summaries in to one larger summary (Synth1) is of greater benefit.

TABLE 2

| Candidate Summary | dimensions | rows | rows in detail | SDR (level of reduction) |
|---|---|---|---|---|
| Sum1 | D1 | 10 | 2000 | 0.005 |
| Sum2 | D2 | 50 | 2000 | 0.025 |
| Synth1 | D1, D2 | 500 | 2000 | 0.25 |

The Performance Gain Calculation is performed using the equation:

$$\text{Perf gain}=100-(((iSDR1-iSDR2)/iSDR1)*100) \qquad (4)$$

Where:
iSDR=1−SDR
iSDR1=iSDR of the advice under review
iSDR2=iSDR of the synth/fk-based advice In order to decide whether the summary table Synth1 should be used, it is necessary to determine the performance gain obtained by replacing Sum1 with Synth1, which in this case is:

$$\% \text{ Performance Gain}=100-(((0.995-0.75)/0.995)*100)$$
$$=75.38 \qquad \text{(in terms of maximum gain available)}$$

Secondly, it is necessary to consider replacing Sum2 with Synth1

$$\% \text{ Performance Gain}=100-(((0.975-0.75)/0.0975)*100)$$
$$=76.93 \qquad \text{(in terms of maximum gain available)}$$

The above % Performance Gain figures indicate how much of the theoretical maximum achievable performance gain is still available, even with the increase in coverage.

Accordingly, using these Figures, summary tables would be created on the basis of the criteria shown in Table 3:

TABLE 3

| % Predetermined | 76% | 75% |
|---|---|---|
| Replace Sum 1 (D1) with Synth1? | No | Yes |
| Replace Sum 2 (D2) with Synth1? | Yes | Yes |

Thus, if the policy settings had been set to indicate 77% predetermined queries, the recommended summaries would be Synth1 (D1,D2) and Sum1 (D1).

If however, the policy settings were set to 75% predetermined queries, the recommended summaries would be Synth1 (D1,D2) only.

Since coverage is implicitly increased by generalisation, there is no specific test to see if coverage has increased by a certain amount; any increase in coverage will be acceptable as long as the performance measure is met.

The Generaliser Algorithm

In order to determine what synthetic summaries to test with the above Performance Gain Algorithm, larger summary tables are derived from the list of perfect match summaries (which would represent the summary tables generated if the policy settings were set on 100% Predetermined Queries).

The list of derived summaries is governed by the Generaliser Algorithm set out below:

The first part of the generalization process is to separate the workload advice into discrete subsets for processing by the algorithm. The subsets are as follows:

Those workload advice items that cannot be generalized. These are advice objects that select from more than one fact table.

Those workload advice items that select all their items from the same table. (referred to here as 'the single table set').

Those workload advice items that select from fact and detail tables with joins. (referred to here as 'the multiple detail set').

Once these subsets have been created a two phase generalizing algorithm is used.

Phase one—replaces axis items from detail tables with foreign keys from the fact table.

Phase two—generalizes the single table advice set, by combining two (or more) workload advice objects to create a single more general synthetic advice object.

For instance, imagine the case where the following workload advice has been generated:

1. emp.grade, dept.mgrno, sum(emp.sal)
2. emp.grade, dept.mmno sum(emp.sal)

If the dept.mgrno and dept.mmno axis items where replaced with a foreign key, in this case emp.deptno, then the same summary (emp.grade, emp.deptno, sum(emp.sal)) could be used to answer both queries by the rewrite algorithm and join back to detail. This is the motivation for the first phase algorithm.

The algorithm first attempts to create a set of normalized advice objects, that represents all the advice in the multiple detail set. It then makes multiple passes over the multiple detail set and attempts to assign sets of candidates to each of the normalized advice based on logical correctness and the performance required. If a particular synthesized advice performantly answers a set of candidates and its summary table would contain less rows than the sum of the rows for the candidates, they will be removed from the output list and the new synthetic summary will be added.

The process for this is shown in the following pseudo-code:

```
Iterate over the normalized set of FKAdvice
    Assign first FK based advice to currFKAdvice
    Create and empty set MDCandidates
    Iterate over the multiple detail set
        assign the current advice currMDAdvice
        If currFKAdvice answers currMDAdvice
            Add currMDAdvice to MDCandidates
        End if
    End iteration
    If there are candidates and currFKAdvice cardinality is less than
```

```
        MDCandidates cardinality
            Compose MDCandidates into currFKAdvice
            Add currFKAdvice to results set
        else
            Return MDCandidates to multiple detail set
        End if
    End iteration
```

After this algorithm there will hopefully be a reduced set of multiple detail advice and a set of foreign key based advice these are combined into a single list which is considered the result of the first phase algorithm. As the first phase algorithm is essentially attempting to roll up the workload advice that meets the criteria, and as the normalized set will be finite, there is no stopping issue that needs to be resolved.

In the second phase, for instance, imagine the case where the following workload advice has been generated:

1. emp.grade, emp.deptno, sum(emp.sal)
2. emp.grade, emp.job, sum(emp.sal)

We could create a single advice item that will answer both with some degree of aggregation:

3. emp.grade, emp.deptno, emp.job, sum(emp.sal)

This is the motivation for the second phase of the generalization algorithm. There are a number of issues with type of algorithm that need to be addressed. Specifically in this instance we need to worry about when to stop. It is conceivable that there could be a large amount of input advice to consider and a low setting on the performance scale could lead to a long processing time and also the generation of a small number of very large and poorly performing summaries. To overcome this issue it is necessary to derive some stopping heuristic.

The stopping criteria for this algorithm works by ranking single table advice in terms of benefit, then it attempts to generate synthetic advice. It continues to do this until there is no unsynthesized advice remaining to be processed, or it fails to construct a useful advice once it has started to create some. What this means is that once a synthetic advice has successfully passed all performance requirements and will be made, if we subsequently create a synthetic advice that fails on performance we will stop. The initial ranking of advice in benefit order is crucial in assisting the creation of best possible candidates first.

Once the items have been ranked in benefit order, the top ranked workload advice is compared with each of the other workload advice items to find the best possible candidate partner for it. The best candidate must have the same measures, and must have the smallest ratio of size to overlap with the top ranked advice. In the event of a tie, advice with fewer axis items will be selected, if there is still a tie then the quality of the axis items involved will be taken into account. This value is determined by the number of advice items the axis item appears in. If after all this there is still a tie, the algorithm will arbitrarily select the existing best candidate.

After the best candidate has been selected, the remaining workload advice is scanned for candidates that would be able to rewrite against the generated advice. If the cardinality of this set is greater than zero, and if the synthetic advice can fit in the space of the candidates it would replace it is added to the result set.

Once a set of synthetic advice has been generated any remaining single table advice is combined with it and this combined set is returned as the result. The algorithm is presented in pseudo code form below:

```
    Iterate over single table advice
        Clear bestAdvice
        Cache the current advice in Advice1
        Iterate over remaining advice
            Cache the current advice in advice2
            If the combination of advice1 and advice2 is better than bestAdvice
                Replace bestAdvice with this one
            End if
        End Iteration
        If this synthAdvice meets performance and coverage constraints
            Add to synth advice list
            Remove all advice objects satisfied by this query from single table
                advice
        Else
            If we have already made at least one synthetic advice
                continue = false;
            End if
        End if
    End Iteration
```

Without Workload Information

In addition to the above algorithms, which are driven by the presence of workload statistics, ASM has an alternative algorithm for the situation where no previous usage history is available.

Under these circumstances recommendations for deletion would not exist.

Recommendations for creation would be restricted to exact match summaries based on an internal definition of a fact table, which is a table which:

has no subordinates is a subordinate of at least one master table has at least one data-point column (a column of a type that would by default have a measure placed on it within Discoverer).

General

It will be realised that although the above has been described with respect to a stand alone processing system, the system may also be implemented on remote database systems. Thus, the apparatus described in FIG. 1 may be replaced by a database located at a remote location and which is connected to a number of end stations via a communications network, such as the Internet. This allows the end stations to access the database via the Internet. It will be understood that by a person skilled in the art, in this case users would enter a query at the end station and this would then be transferred to the database system. The database system would include a processor for reviewing the query which would operate in the same way as the processor 2 described above. The processor would then obtain the data which can then be returned to the end station via the communications network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

We claim:

1. Apparatus for creating summaries of a database, the database being responsive to a query to provide data, the apparatus comprising a processor coupled to a database, the processor being adapted to:
  a. monitor the usage of the database; and,
  b. determine one or more summaries in accordance with the usage and in accordance with space available for summary storage;
  wherein the one or more summaries are determined by causing the processor to:
    i. determine an item ranking for each query made based on a number of times the query was requested and based on an average elapsed time to respond to the query;
    ii. determine an order of importance of each query for summary table creation based on a need for performance improvement for each query relative to other queries, the need for performance improvement determined based on the item rankings;
    iii. determine exact match summary tables for at least a portion of the queries for which an order of importance has been determined;
    iv. determine, for each query for which an exact match summary table has been determined, a reduction in execution time of the query that will be obtained by using the exact match summary table for the query; and
    v. select a set of summary tables providing in a reduction execution time for all queries as a whole.

2. Apparatus according to claim 1, wherein the processor monitors the usage of the database by monitoring:
  i. a number of queries made; and,
  ii. a length of time taken for the database to generate a response to each query.

3. Apparatus according to claim 1, wherein the one or more summaries are determined by causing the processor to:
  i. propose a number of summaries;
  ii. determine the improvement achieved by using the proposed summaries relative to space used for storage of the summaries; and,
  iii. select one or more of the summaries in accordance wit the improvement achieved using the summary and in accordance with space available for summary storage.

4. Apparatus according to claim 3, at least some of the proposed summaries correspond to data provided by the database in response to a received query.

5. Apparatus according to claim 3, wherein the processor proposes summaries in accordance with a number of defined proposal parameters.

6. Apparatus according to claim 5, wherein the defined proposal parameters include an indication of the nature of the queries submitted to the database.

7. Apparatus according to claim 3, wherein the processor is adapted to determine the improvement achieved in accordance with:
  i. the length of time taken for the database to generate a response to each query with a summary present;
  ii. the length of time that would be taken for the database to generate a response with no summary present; and,
  iii. the number of times each query is submitted to the database in a given time period.

8. Apparatus according to claim 7, wherein the length of time that would be taken for the database to generate a response with no summary present is estimated in accordance with the size of the summary and a predetermined algorithm.

9. Apparatus according to claim 1, wherein the processor is further coupled to a store, the processor being further adapted to generate selected one(s) of the one or more determined summaries using data from the database, the summaries being stored in the store.

10. Apparatus according to claim 9, wherein the processor is adapted to select the summaries in accordance with a number of selection parameters.

11. Apparatus according to claim 10, wherein the select on parameters include the size of the store.

12. Apparatus according to claim 9, wherein the database forms part of the store, the summaries being stored in the database.

13. Apparatus according to claim 1, wherein the processor is further adapted to repeatedly modify the summaries in accordance with the usage at a predetermined time interval.

14. Apparatus according to claim 13, wherein the predetermined time interval is 24 hours.

15. Apparatus according to claim 13, wherein the summaries are modified by deleting summaries in accordance with the usage.

16. Apparatus according to claim 13, wherein the summaries are modified by repeating steps (a) and (b) to determine one or more new summaries and then generating selected ones of the one or more new summaries.

17. Apparatus according to claim 1, wherein the processor determines an item ranking for each query made according to:

$$IR = \log(f)^2 \times \log(elt+1);$$

wherein IR is the item ranking of the query, f, is a number of times the query was requested, and elt is the average elapsed time to respond to the query.

18. Apparatus according to claim 17, wherein the processor determines an order of importance of each query by causing the processor to:
  i. determine a fact percentage ranking according to:

$$FPR = (\Sigma fIR / \Sigma IR) \times 100,$$

wherein FPR is the fact percentage ranking, $\Sigma fIR$ is the sum of the item rankings of each query using a fact table, and $\Sigma IR$ is the sum of the item rankings of all queries;
  ii. modify the item rankings for each query based on the fact percentage ranking; and
  iii. sort the queries according to the modified item rankings.

19. Apparatus according to claim 18, wherein the processor determines for each exact match summary table a reduction in execution time of queries using the exact match summary table by causing the processor to:
  i. determine a reduction factor representing a reduction in data between the summary table and a summarized detail table;
  ii. determine an average execution time for each query that would have used the summary table; and
  iii. determine execution time saved for the summary table based on the average execution time and on the reduction factor.

* * * * *

UNITED STATES PATENT AND TRADEMARK OFFICE
CERTIFICATE OF CORRECTION

PATENT NO. : 6,678,676 B2
DATED : January 13, 2003
INVENTOR(S) : Paul Philip Brickell, Stephen David Cave and Robert Lloyd Lavender It is certified that error appears in the above-identified patent and that said Letters Patent is hereby corrected as shown below:

Title page,
Item [75], Inventors, "Bradlow Ledbury (GB)" should be -- Bath (GB) --.
Add item:
-- [30]     Foreign Application Priority Data
         June 9, 2000 (GB) ................ 0014217.4 --.

Column 15,
Line 39, "wit" should be -- with --.

Column 16,
Line 9, "select on" should be -- selection --.

Signed and Sealed this

Eleventh Day of May, 2004

JON W. DUDAS
*Acting Director of the United States Patent and Trademark Office*